(12) United States Patent
Fiaschi et al.

(10) Patent No.: US 8,457,141 B2
(45) Date of Patent: Jun. 4, 2013

(54) TELECOMMUNICATION NETWORK

(75) Inventors: Giovanni Fiaschi, Genoa (IT); Edoardo Mongiardini, Arenzano (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 12/677,376

(22) PCT Filed: Sep. 9, 2008

(86) PCT No.: PCT/EP2008/061922
§ 371 (c)(1),
(2), (4) Date: Jun. 25, 2010

(87) PCT Pub. No.: WO2009/040244
PCT Pub. Date: Apr. 2, 2009

(65) Prior Publication Data
US 2010/0265819 A1 Oct. 21, 2010

(30) Foreign Application Priority Data

Sep. 28, 2007 (GB) .................................. 0718946.7
Nov. 13, 2007 (EP) .................................. 07120565

(51) Int. Cl.
*H04L 12/56* (2006.01)
(52) U.S. Cl.
USPC .......................................... 370/406; 370/401
(58) Field of Classification Search
USPC ................. 370/338, 535, 352, 401, 311, 330, 370/335, 337, 342, 278, 280, 406; 455/509, 455/517, 522
See application file for complete search history.

(56) References Cited

U.S. PATENT DOCUMENTS 7,623,508 B2 * 11/2009 Khoury et al. ................ 370/352
2004/0109408 A1 6/2004 Mesh et al.

FOREIGN PATENT DOCUMENTS

WO   WO 2005/081435   9/2005

OTHER PUBLICATIONS

International Search Report for PCT/EP2008/061922, mailed Dec. 4, 2008.
Generic protection switching—Linear trail and subnetwork protection; G.808.1 (Mar. 2006), *ITU-T Standard in Force*, Mar. 29, 2006, (59 pages) XP 017404637.
CCAMP GMPLS P&R Design Team Dimitri PapaDimitriou (Editor), Analysis of Generalized Multi-Protocol Label Switching (GMPLS)-based Recovery Mechanisms (including Protection and Restoration), *Standard Working Draft, Internet Engineering Task Force*, vol. ccamp, No. 5, Apr. 1, 2005, pp. 1-42, XP015038127.

* cited by examiner

*Primary Examiner* — Chandrahas Patel
(74) *Attorney, Agent, or Firm* — Nixon & Vanderhye P.C.

(57) ABSTRACT

A telecommunications network comprising first and second access equipment on one side of the network and third and fourth access equipment on another side of the network, a respective communication link is provided between the first and the third access equipment and between the second and fourth access equipment, and further, a communication link is provided between the first and the second access equipment, and between the third and fourth access equipment, each access equipment providing an interface for communication with the network, and each access equipment is configured to be capable of causing a change in the path followed by at least some of the traffic conveyed over the communication links.

19 Claims, 3 Drawing Sheets

TELECOMMUNICATION NETWORK

This application is the U.S. national phase of International Application No. PCT/EP2008/061922 filed 9 Sep. 2008 which designated the U.S. and claims priority to GB Patent Application No. 0718946.7 filed 28 Sep. 2007 and EP Patent Application No. 07120565 filed 13 Nov. 2007, the entire contents of each of which are hereby incorporated by reference.

TECHNICAL FIELD

The present invention relates generally to telecommunication networks.

BACKGROUND

Known transport networks use circuit oriented technologies (eg Synchronous Digital Hierarchy (SDH) and more recently wavelength switching) and include sophisticated restoration schemes, including double path protections (eg Sub-Network Connection Protection (SNCP)), bandwidth sharing restorations (eg supported by control planes Automatically Switched Transport Network (ASTN)/Generalised Multi-Protocol Label Switching (GMPLS)) and even dual ended restorations (eg International patent application WO 2005/081435 A1).

A major application of transport networks is to provide support to a packet network interconnection (eg backbone Internet Protocol (IP) routers). In this application, it is known to engineer the IP network already with its own resilience schemes. These generally account for the totality of reliability of IP backbone networks, and in transport networks unprotected connections are used.

SUMMARY

According to a first aspect of the technology described in this application there is provided a telecommunications network comprising first and second access equipment on one side of the network and third and fourth access equipment on another side of the network. A respective communication link is provided between the first and the third access equipment and between the second and fourth access equipment. Further, a communication link is provided between the first and the second access equipment, and between the third and fourth access equipment. Each access equipment provides an interface for communication with the network, and each access equipment is configured to be capable of causing a change in the path followed by at least some of the traffic over the communication links.

In one non-limiting, example embodiment, a restoration scheme is implemented in the transport network with integrated packet switching functions which allows an improved integration with a client packet network and in particular an IP backbone interconnection. This advantageously results in there being no single point of failure. Also, since emulation of independent connections is realised, this advantageously avoids changes having to be made on the IP routers of the client packet network.

According to another aspect of the technology described in this application, there is provided a method of controlling traffic in the telecommunications network of the first aspect. The method comprises at least one of the access equipments altering the path followed by at least some of the traffic over the links.

According to another aspect of the technology described in this application, there is provided network access equipment for providing an interface to a telecommunications network, the equipment comprising three interface ports and further comprising a switch arrangement The switch arrangement is configured, in use, to cause traffic input at a first interface port to be output from a third interface port instead of being output at a second interface port.

The network access equipment may comprise a processor, for example an interface card, to control the switch arrangement in accordance with instructions stored in a memory.

In one non-limiting, example embodiment, restoration techniques on a circuit oriented transport network are combined with packet flow forwarding and multiplexing on the access devices interfacing a client packet network. The restoration mechanisms may be supported either by an automatic control plane or by a combination of embedded signalling and management functions.

DETAILED DESCRIPTION

Figure 1:
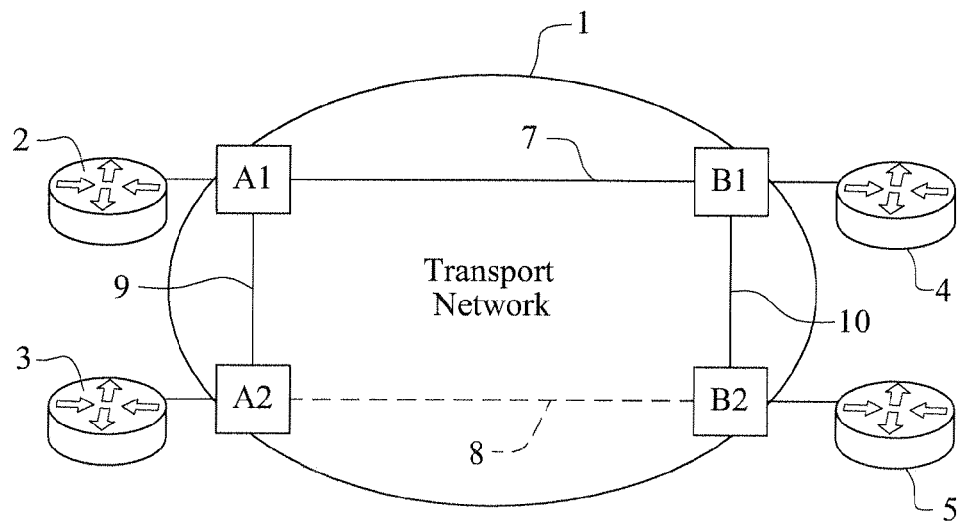
FIG. 1 is a schematic representation of a network.

With reference initially to FIG. 1 there is shown a telecommunications network 1 in the form of a transport network and comprising first and second access devices A1 and A2 on one side of the network and third and fourth access devices B1 and B2 on the other side of the network. Each network device comprises an interface card. The access devices A1 and B1, and A2 and B2, are connected by respective (long-distance) communication connections 7 and 8. Furthermore, access devices A1 and A2, and B1 and B2, are connected by a respective communication connection 9 and 10. Routers 2, 3, 4 and 5 are connected to the access devices A1, A2, B1 and B2 respectively. The routers form part of respective IP backbone networks. Each access device provides an interface to the network 1 for the respective router to allow traffic to be sent and/or received to/from another router on the other side of the network 1.

The connection 8 between interconnected routers is the restoration connection (represented by a dashed line), so that it can be implemented only during a fault condition and use shared resources.

Figure 3:
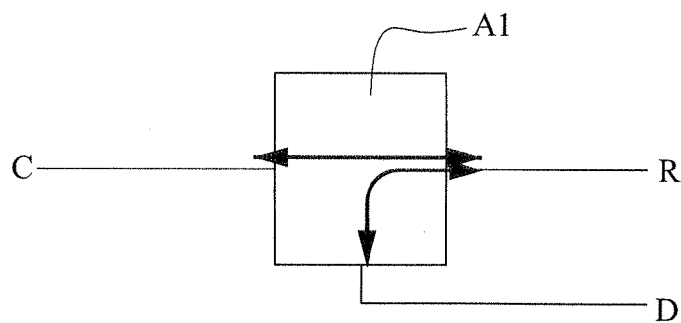
FIG. 3 is a block diagram of the node of FIG. 2 in a second condition.

FIG. 3 shows the packet forwarding capabilities of the access device A1. However, each of the access devices A2, B1 and B2 has identical capabilities. Each access device comprises three interface ports: C towards the respective client router, R towards the transport connection to the core router and D towards the transport connection to its (corresponding) access device on that side of the network 1.

Figure 2:
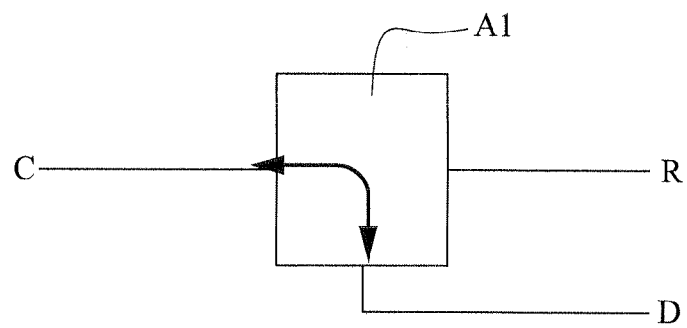
FIG. 2 is a block diagram of a node of the network of FIG. 1 in a first condition.

If interface R is disabled (either performing a restoration role in normal conditions or when the connection is faulty), the packet forwarding functions are between C and D, as shown in FIG. 2, in a DET or detour mode.

If interface R is enabled (working connection in normal conditions or activated restoration during a fault), packets are forwarded between C and R and between D and R, as in FIG. 3 in a MUX or multiplexing mode. Packets sent from C to R and D to R must be tagged to distinguish between C and D.

Packets sent from R to C and D must be inspected and have the tag removed which was added by the (remote) access device, to decide if the packet must be forwarded to C or D.

Each access device A1, A2, B1 and B2 each comprises a monitoring arrangement (for example circuit alarm detection or Operations, Administration and Management (OAM)) to monitor the alarm status of the transport connections 7, 8, 9 and 10 that originate from them.

Counterpart access devices (eg A1 and A2) must communicate (eg on the overhead information of the transport connection between them) the alarm status of the long (R) distance connection (eg A1 must communicate to A2 the status of the connection 7 from A1 to B1). The connections 9 and 10 between each two counterpart access devices are used also to monitor the status of the access device itself.

Status monitoring using the connections, 7, 8, 9 and 10 can be achieved in various ways. One way comprises each device periodically, or on demand, issuing a status signal. Should such a signal not be received or be indicative of a fault having been detected, then the appropriate re-routing can be effected.

If one of the following conditions is met, the restoration connection 8 must be activated:
1. the (working) connection 7 is faulty,
2. the connection 9 or 10 between (corresponding) access devices is faulty, or
3. the access device originating the working transport connection 7 is faulty.

The restoration transport connection 8 can be activated according to any suitable scheme or protocol. Some examples are:
  pre-planned restoration—the restoration path and the resources it uses (during the fault) are defined (and stored in each access device) at the time of connection definition; resources can only be shared with restoration paths whose working path does not share common points of failure;
  on-the-fly restoration with a distributed control plane—the restoration path is computed by the access device that originates the path after fault detection; the access device must maintain an updated database of the network topology and operational status of the other access devices and communication links; and
  optical restoration with shared wavelengths—a pre-planned scheme can be applied to an all-optical network; the shared resources are represented by the wavelengths used by the restoration light paths.

Alternatively the access devices may be arranged to communicate operational status information with (separate) control equipment, and the control equipment is operative to control the access devices accordingly by way of control signals.

Various examples are now provided of how the above described switching functionality of the access devices A1, A2, B1 and B2 is used to advantageously re-route traffic in the event of a fault or a congestion condition.

Figure 4:
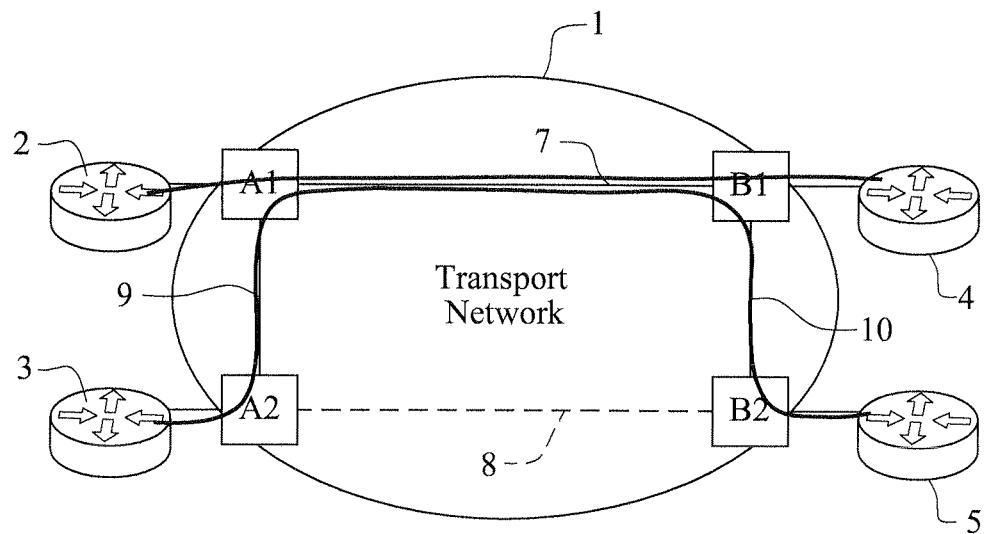
FIGS. 4, 5, 6 and 7 are further schematic representations of the network of FIG. 1.

Reference is now made to FIG. 4 in which thickened lines show the traffic flow under normal conditions. Traffic of both router paths is multiplexed on the working connection 7 by the access devices A1 and B1. The multiplexing is feasible because each router pair will transport half of the traffic. If one of the routers fails, its traffic will drop to zero, while the operational router pair will carry the total traffic, the sum of traffic between A1 and B1 remaining constant.

Figure 5:
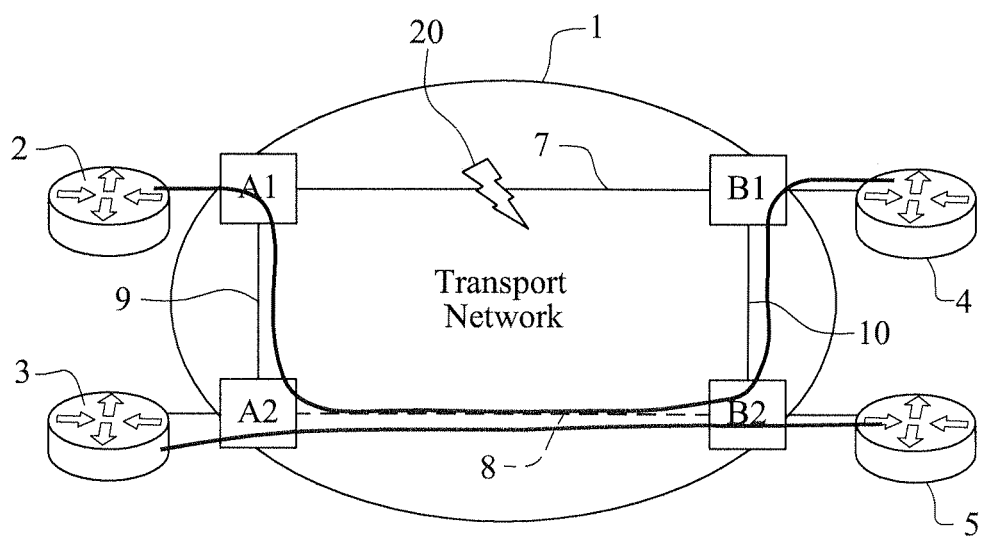

FIG. 5 shows how the traffic flow is re-distributed when a fault 20 affects the working connection 7 between A1 and B1. Switching within the access devices causes traffic to follow a path comprising connections 8, 9 and 10.

Figure 6:
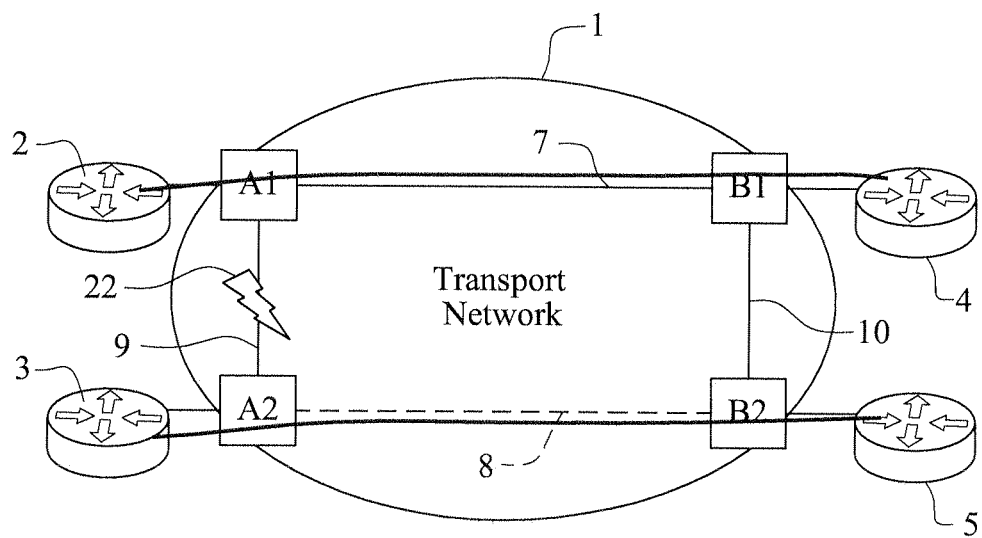

FIG. 6 shows the traffic flow when the connection 9 between the two access devices A1 and B1 is broken at 22. Both working and restoration connections 7 and 8 are simultaneously active carrying traffic. In the situation of there being no fault on any of the routers, each router carries half of the total traffic.

Figure 7:
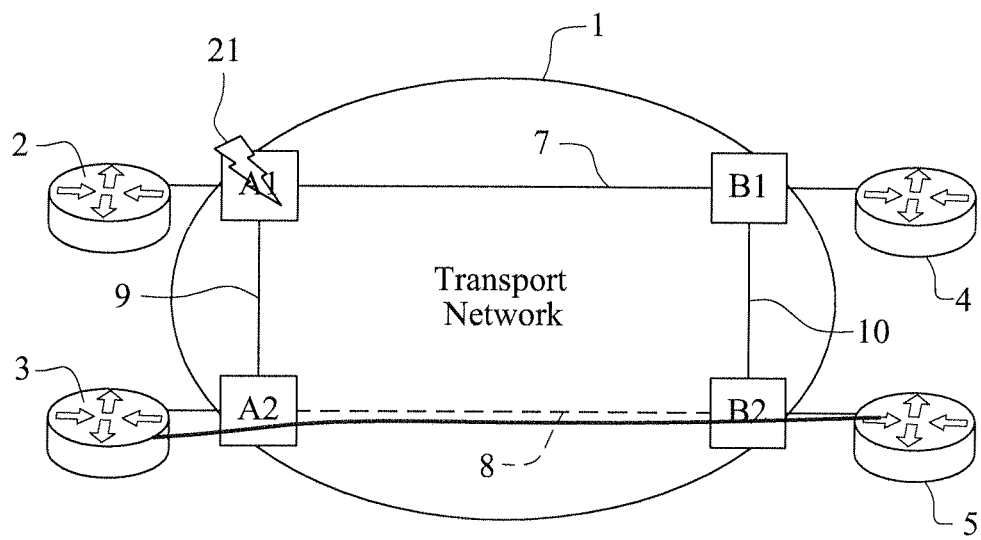

FIG. 7 shows the traffic flow in the case of a fault 21 on access device A1. If the fault is on the access device originating the working connection 7, the restoration connection 8 is activated. If however the fault is on an access device originating the restoration connection 8, no restoration is activated and the restoration bandwidth is free for other restorations on the network. The routers 3 and 5 adjust their traffic according with the changed topology and the connected pair will carry the total traffic.

Although it is assumed that the sum of traffic sent by the two routers A1 and B1 never exceeds the capacity of a single interface towards the transport network 1, it is good practice to define within each router a response for the anomalous condition where this condition is not satisfied.

The congestion condition occurs when the access device in MUX mode detects congestion (eg queue overflow or queue crossing a certain threshold). This condition can be communicated to the counterpart access device, that is supposed to be in DET mode in which the R connection is not activated.

The determination of the congestion condition from the access device in MUX mode to the access device in DET mode can trigger the activation of the restoration connection 8. In this way, extra transport capacity is allocated and the congestion condition is removed. Both access devices (eg A1 and A2) are then in MUX mode.

The above described embodiments result in numerous advantages over known router interconnection arrangements. These include increasing savings in the restoration resources which is achieved by shared restoration arrangements and also enhancing survivability, ie resilience to combinations of multiple faults.

It is also to be noted that all functionality of a conventional router interconnection scheme is preserved in the illustrated embodiment.

The invention claimed is:

1. A telecommunications packet network comprising:
  first west and second west access equipment on one side of the network and first east and second east access equipment on another side of the network,
  a respective first transport communication link provided between the first west and the first east access equipment, and a respective second transport communication link provided between the second west and second east access equipment,
  a respective west restoration communication link provided between the first west and the second west access equipment, and a respective east restoration communication link is provided between the first east and the second east access equipment,
  each access equipment includes a router interface for connection to a respective router for communication with the network, a transport interface for connection to the respective transport communications link, and a restoration interface for connection to the respective restoration communication link, and
  each access equipment is configured to forward packets received from its router interface and its restoration interface only to its transport interface when its transport interface is enabled and to forward packets received from its router interface to its restoration interface when its transport interface is disabled.

2. A telecommunications packet network as claimed in claim 1 in which at least one of the access equipments comprises a switch arrangement.

3. A telecommunications packet network as claimed in claim 1 in which the access equipments are capable of packet switching.

4. A telecommunications packet network as claimed in claim 1 in which the access equipments are configured to be capable of determining the identity of the access equipment from which a received data packet originates by way of inspecting an identifier tag of the packet.

5. A telecommunications packet network in claim 1 in which the access equipments are each capable of incorporating an identifier tag with a received data packet, which tag is indicative of the access equipment which incorporated the tag with the data packet.

6. A telecommunications packet network as claimed in claim 5 in which each of the access equipments is capable of removing an identifier tag of a received data packet, which data packet is to be output by the access equipment, and is further capable of replacing the tag with another identifier tag which is indicative of that access equipment.

7. A telecommunications packet network as claimed in claim 1 in which the access equipments are configured to communicate with each other to determine whether at least some of the traffic is to be re-routed.

8. A telecommunications packet network as claimed in claim 7 in which the access equipments are configured to communicate operational status information relating to the access equipments and/or the communication links in between.

9. A telecommunications packet network in claim 1 which comprises a transport network.

10. A method of controlling traffic in a telecommunications packet network, the network comprising:
    first and second west access equipment on one side of the network and first and second east access equipment on another side of the network,
    a respective first transport communication link is provided between the first west and the first east access equipment, and a respective second transport communication link is provided between the second west and the second east access equipment,
    a respective west restoration communication link is provided between the first and the second west access equipment and a respective east restoration communication link is provided between the first and the second east access equipment,
    each access equipment providing a router interface for connection to a respective router for communication with the network, a transport interface for connection to the respective transport communications link, and a restoration interface for connection to the respective restoration communication link,
    and the method comprising at each access equipment:
    forwarding packets received from its router interface and its restoration interface only to its transport interface when its transport interface is enabled, and
    forwarding packets received from its router interface to its restoration interface when its transport interface is disabled.

11. A method as claimed in claim 10 in which the access equipment alters a packet forwarding path by way of a switch operation.

12. A method as claimed in claim 10 in which the at least one access equipment alters a packet forwarding path subsequent to receiving a control signal.

13. A method as claimed in claim 10 which comprises monitoring for whether a fault condition exists in a communication link between the access equipments.

14. A method as claimed in claim 13 in which the path is altered on determination of the fault condition.

15. A method as claimed in claim 10 which comprises monitoring for whether a fault condition exists in an access equipment.

16. A method as claimed in claim 10 which comprises altering a packet forwarding path so as to bypass a fault in the network.

17. A method as claimed in claim 10 comprising conveying all packet traffic across the network over the first transport communication link between the first west and the first east access equipment and then re-routing the packet traffic to be conveyed across the network via the second transport communication link between the second west and the second east access equipments.

18. Network access equipment for an interface for a telecommunications packet network, the equipment comprising:
    a router interface for connection to a respective router for communication with the network, a transport interface for connection to a respective transport communication link, and a restoration interface for connection to a respective restoration communications link, and
    a switch arrangement configured, in use, to cause traffic input at the router interface and the restoration interface to be output only from the transport interface when the transport interface is enabled and to cause traffic input at the router interface to be output from the restoration interface when the transport interface is disabled.

19. Network access equipment as claimed in claim 18 which is configured to receive a control signal and to cause operation of the switch arrangement on receipt of the control signal.

* * * * *

UNITED STATES PATENT AND TRADEMARK OFFICE
CERTIFICATE OF CORRECTION

PATENT NO. : 8,457,141 B2  
APPLICATION NO. : 12/677376  
DATED : June 4, 2013  
INVENTOR(S) : Fiaschi et al.

It is certified that error appears in the above-identified patent and that said Letters Patent is hereby corrected as shown below:

In the Specification

In Column 2, Line 5, delete "arrangement" and insert -- arrangement. --, therefor.

In Column 3, Line 59, delete "Bl." and insert -- B1. --, therefor.

In Column 3, Line 65, "Bl." and insert -- B1. --, therefor.

Signed and Sealed this  
Twelfth Day of November, 2013

Teresa Stanek Rea  
*Deputy Director of the United States Patent and Trademark Office*